(12) United States Patent
Tang et al.

(10) Patent No.: US 11,309,781 B2
(45) Date of Patent: Apr. 19, 2022

(54) LINEAR VIBRATION MOTOR

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 359 days.

(21) Appl. No.: 16/705,263

(22) Filed: Dec. 6, 2019

(65) Prior Publication Data

US 2020/0212781 A1 Jul. 2, 2020

(30) Foreign Application Priority Data

Dec. 27, 2018 (CN) .......................... 201811610760.9

(51) Int. Cl.
*H02K 33/02* (2006.01)
*H02K 33/18* (2006.01)
*B06B 1/04* (2006.01)

(52) U.S. Cl.
CPC .............. *H02K 33/18* (2013.01); *B06B 1/045* (2013.01)

(58) Field of Classification Search
CPC .......... H02K 1/34; H02K 33/02; H02K 33/06; H02K 33/16; H02K 33/18; B06B 1/045
See application file for complete search history.

(56) References Cited

U.S. PATENT DOCUMENTS

2010/0213773 A1* 8/2010 Dong ..................... H02K 33/16
310/25
2018/0229270 A1* 8/2018 Nakazato ............... H02K 33/16

FOREIGN PATENT DOCUMENTS

CN         108880169 A1    11/2018

OTHER PUBLICATIONS

PCT search report dated Jan. 19, 2020 by SIPO in related PCT Patent Application No. PCT/CN2019/111294 (5 Pages).
PCT written comments dated Jan. 19, 2020 by SIPO in related PCT Patent Application No. PCT/CN2019/111294 (4 Pages).

* cited by examiner

*Primary Examiner* — Ramon M Barrera
(74) *Attorney, Agent, or Firm* — W&G Law Group

(57) ABSTRACT

An embodiment of the invention provides a linear vibration motor. The linear vibration motor includes a base, a vibration unit, an elastic piece and a coil assembly. The vibration unit includes a weight, a containing groove penetrating the weight, and two magnets arranged in the containing groove. The elastic piece is located on one side of the vibration unit and is connected with the vibration unit. The coil assembly has an iron core and a coil wound around the iron core. The two magnets are magnetized such that the magnetic poles of the two magnets are oppositely arranged. The magnetizing direction of the coil assembly is perpendicular to the vibration direction and is parallel to the connecting line of the two magnets. Compared with the related art, the linear vibration motor is improved in vibration performance and reliability.

8 Claims, 3 Drawing Sheets

LINEAR VIBRATION MOTOR

FIELD OF THE PRESENT DISCLOSURE

The present disclosure relates to the field of electrical transducers, more particularly to a linear vibration motor in a mobile device, for converting electrical signals into tactile feedbacks.

DESCRIPTION OF RELATED ART

With the development of electronic technology, portable consumer electronic products, such as mobile phones, handheld game consoles, navigation devices or handheld multimedia entertainment devices are more and more popular. These electronic products generally use linear vibration motors to perform system feedback, such as phone call prompt, information prompt, navigation prompt, vibration feedback of game machines, etc. Such a wide range of applications requires that the vibration motor has excellent performance and long service life.

The linear vibration motor of the related technology comprises a base with a containing space, a vibration unit located in the containing space, an elastic piece for fixing the vibration unit and suspending the vibration unit in the containing space, and a coil fixed to the base. A magnetic field generated by electrification of the coil interacts with a magnetic field generated by the vibration unit to drive the vibration unit to do reciprocating rectilinear motion to generate vibration.

However, in the related linear vibration motor, the driving force of the vibration unit is only generated by a coil, that is, the vibration unit only vibrates in a driving mode by using Lorentz force, and the vibration effect is limited.

Therefore, it is necessary to provide a new linear vibration motor to solve the above technical problems.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
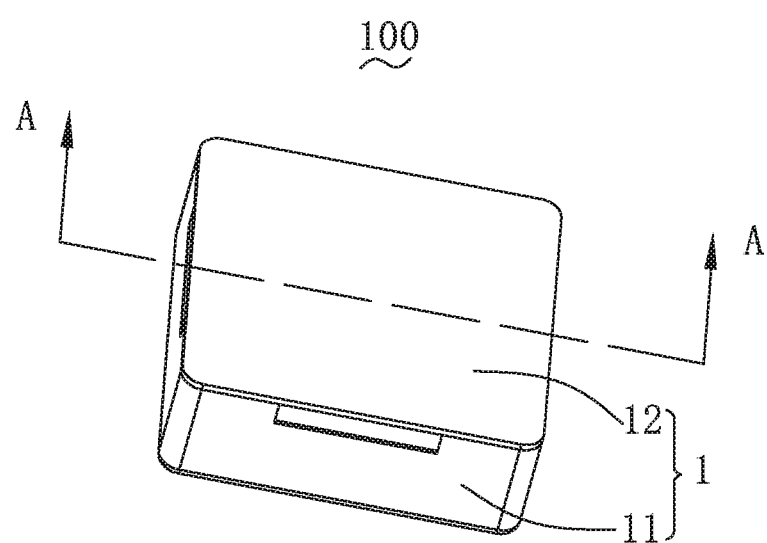
FIG. 1 is an isometric view of a linear vibration motor in accordance with an exemplary embodiment of the present disclosure.
Figure 2:
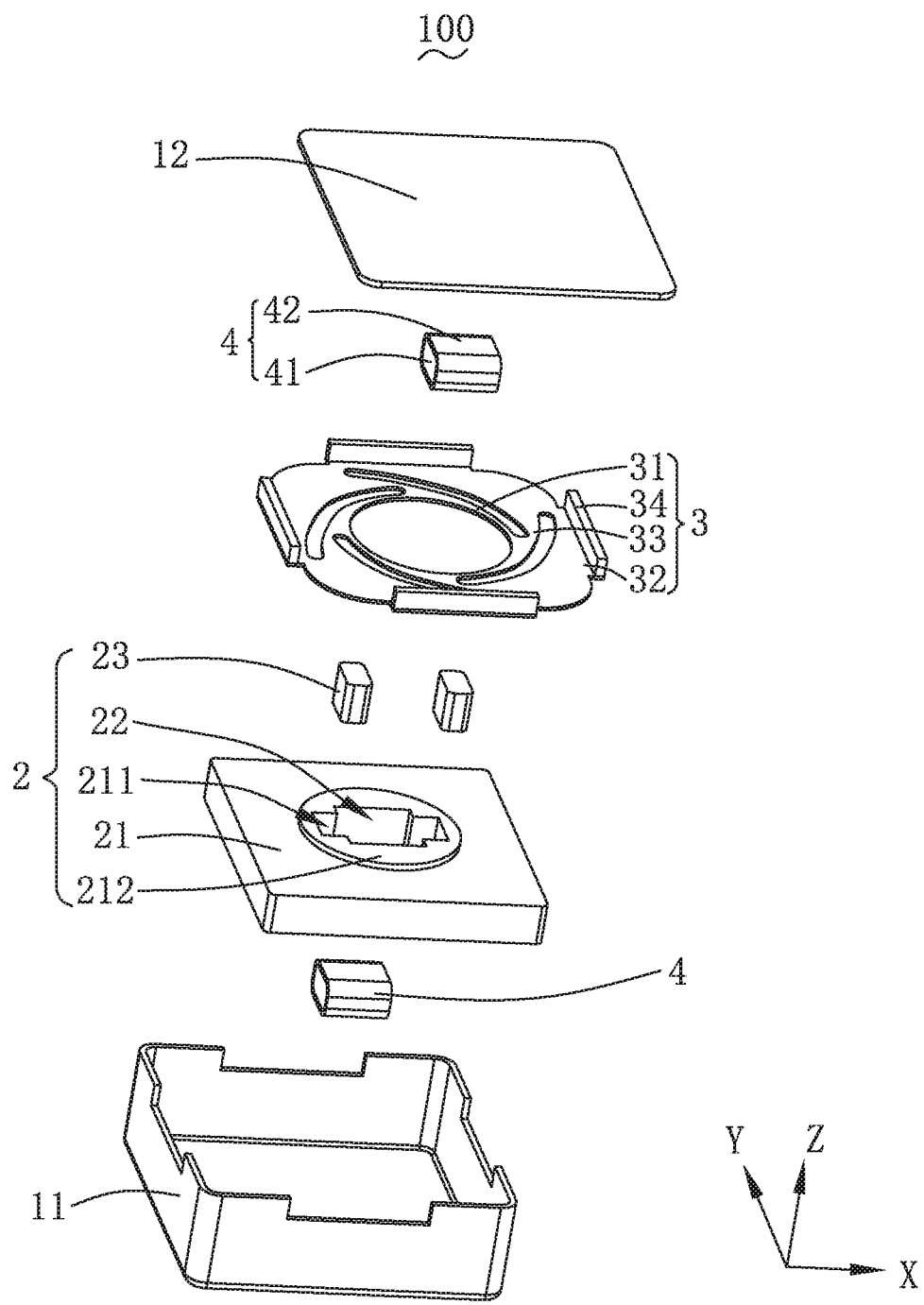
FIG. 2 is an exploded view of the linear vibration motor in FIG. 1.
Figure 3:
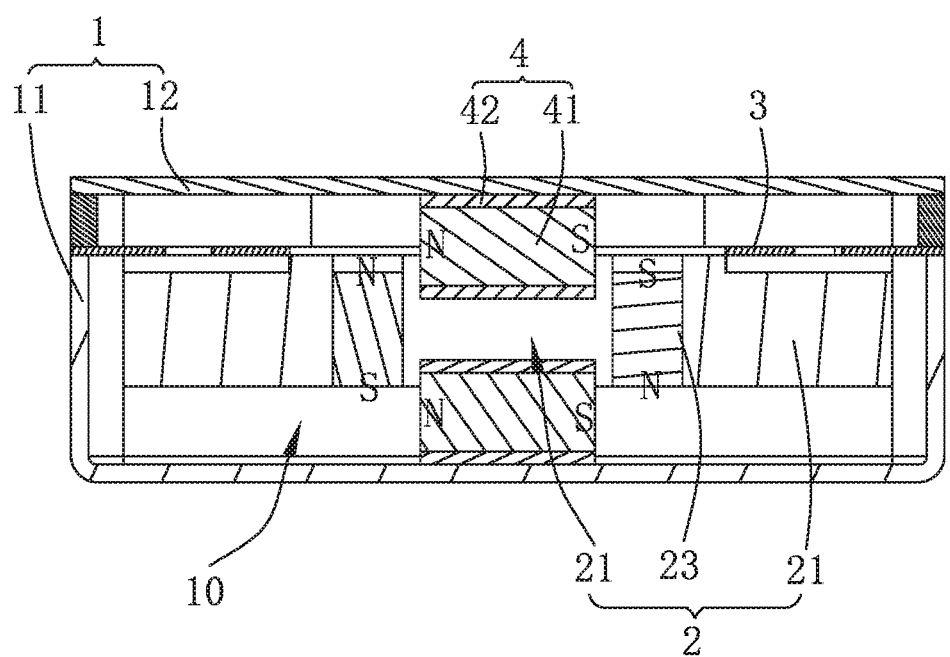
FIG. 3 is a cross-sectional view of the linear vibration motor, taken along line A-A in FIG. 1.

Referring to FIGS. 1-3, an exemplary embodiment of the invention provides a linear vibration motor 100. The linear vibration motor 100 comprises a base 1, a vibration unit 2, an elastic piece 3 and a coil assembly 4.

The base 1 is provided with an accommodating space 10 for accommodating the vibration unit 2, the elastic piece 3 and the coil assembly 4 therein. The base 1 comprises a base plate 11 and a cover plate 12 engaging with the base plate 11 for forming the accommodating space 10 cooperatively.

The vibration unit 2 is located in the accommodating space 10. The elastic piece 3 suspends the vibration unit 2 in the accommodating space and provides a vibration condition. In the embodiment, the elastic piece 3 is located on one side of the vibration unit 2 along a vibration direction, and is connected with the vibration unit 2 to form a z-axis direction vibration configuration (vertical vibration). The coil assembly 4 is fixed to the base 1 and drives the vibration unit 2 to vibrate.

Specifically, the vibration unit 2 comprises a weight 21, a containing groove 22 penetrating through the weight 21 along the vibration direction of the vibration unit 2, two magnets 23 arranged in the containing groove 22 and each forming a distance from the other. The two magnets 23 are fixed with the weight 21, respectively.

In the embodiment, the weight 21 includes a fixing groove 211 and a fixing platform 212.

The fixing groove 211 is formed by downward sinking relative to two opposite sides of the containing groove 22. The fixing platform 212 is formed by extending from one side, close to the elastic piece 3, of the weight 21. The fixing platform 212 extends along a periphery of the containing groove 22, and the two pieces of magnets 23 are respectively fixed in the two fixing grooves 211. In the embodiment, the two magnets 23 are magnetized in the vibration direction (namely the z-axis direction), and the magnetic poles of the two magnets 23 are contrary arranged.

Optionally, in the embodiment, a depth of the fixing groove 211 is equal to a thickness of the magnet 23, which makes the magnets 23 installed in the fixing groove 211 without occupying the space of the containing groove 22, so that the coil assembly 4 can be designed larger, provide greater driving force, and improve the vibration effect of the vibration unit 2.

The elastic piece 3 comprises a ring-shaped first fixing arm 31, a ring-shaped second fixing arm 32, a spring arm 33 connecting the first fixing arm 31 to the second fixing arm 32, and a reinforcing arm 34.

The first fixing arm 31 is arranged around the periphery of the containing groove 22 and is fixedly connected with the weight 21. Specifically, the first fixing arm 31 is sleeved around and fixed with the fixing platform 212, by which, the elastic arm 33 is configured to be suspended.

The second fixing arm 32 is connected to the base 1, and the elastic arm 33 is suspended and is used for providing a vibration restoring force and a supporting force to the vibration unit 2.

The reinforcing arm 34 is formed by bending and extending the periphery of the second fixing arm 32. The reinforcing arm 34 is fixedly connected with the base 1, and the reliability of the first fixing arm 31 is accordingly improved.

The coil assembly 4 is such arranged that an orthographic projection thereof along the vibration direction locates between the two magnets 23 along of the vibration direction. When located, the coil assembly 4 is spaced from the two magnets 23.

Specifically, the coil assembly 4 comprises an iron core 41 fixed to the base 1 and a coil 42 wound around the iron core 41

The magnetizing direction of the coil assembly 4 is perpendicular to the vibration direction (z-axis direction)

and is parallel to a connecting line of the two magnets 23. That is, the magnetizing direction of the coil assembly 4 is along x-axis direction.

In the embodiment, the coil assembly 4 at least partially extends between the two magnets 23 and is spaced from the two magnets 23. More preferably, in the embodiment, the coil assembly 4 comprises two pieces fixed on the base 1 and located on opposite sides of the vibration unit 2 in the vibration direction respectively.

In this embodiment, as shown in FIG. 3, it is further explained that the magnetization direction of the two magnets 23 and the magnetization direction of the two coil assemblies 4 are shown in FIG. 3. When the two iron cores 41 of the two coil assemblies 4 are magnetized by the coils 42 after being electrified, a magnetic field is generated, and the magnetic field direction is the same; then the N-pole of the left magnet 23 and the S-pole of the right magnet 23 are attracted with the iron core 41 located above, and at the same time, the magnet 23 is repelled from the iron core 41 located below, so the vibration unit 2 vibrates downward when the magnet 23 is driven downward. When the coil 42 is powered reversely, the principle is contrary to the above, the magnet 23 is driven upward, and the vibration unit 2 vibrates upward. At the same time, Lorentz force is still generated by the coil 42 and the magnet 23, and the driving mode of combining the magnetic attraction and Lorentz force realizes stronger vibration effect of the linear vibration motor 100.

Compared with the related art, the magnetic poles of the two magnets are oppositely arranged; meanwhile, the magnetizing direction of the coil assembly is perpendicular to the vibration direction and is parallel to the connecting line of the two magnets. When the structure enables the vibration unit of the linear vibration motor to vibrate, the coil assembly is electrified to generate a magnetic field, and the coil assembly interacts with the magnet to generate Lorentz force to realize driving, meanwhile the magnetic poles at the two ends of the iron core are the same as or different from the magnetic poles of the two magnet at the same end respectively, the attracting or repelling acting force is achieved, and the acting force and the alternating acting force of attracting and repelling are achieved through the change of the electrifying direction of the coil. Accordingly, a driving mode of combining electromagnetic attraction force and Lorentz force is used to drive the vibration unit to vibrate, so that the vibration effect of the linear vibration motor is improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
a base with a containing space;
a vibration unit, disposed in the containing space and vibrating along a vibration direction, including a weight, a containing groove penetrating through the weight along the vibration direction, two magnets spaced oppositely in the containing groove and fixed to the weight respectively;
an elastic piece, for suspending the vibration unit in the containing space, located on and fixed to one side of the vibration unit along the vibration direction of the vibration unit;
a coil assembly fixed to the base for driving the vibration unit to vibrate;
wherein
an orthographic projection of the coil assembly along the vibration direction is located between the two magnets and is spaced from the two magnets;
the coil assembly comprises an iron core fixed to the base and a coil wound around the iron core; and
said two magnets are magnetized along the vibration direction, and the magnetic poles of the two magnets are contrary arranged; a magnetizing direction of the coil assembly is perpendicular to the vibration direction and is parallel to a connecting line of the two magnets.

2. The linear vibration motor as described in claim 1, wherein the coil assembly extends partially between two magnets.

3. The linear vibration motor as described in claim 1, wherein the coil assembly comprises two pieces which are both fixed on the base and are respectively positioned on two opposite sides of the vibration unit along the vibration direction.

4. The linear vibration motor as described in claim 1, wherein the weight further comprises two fixing grooves recessed outwards from two opposite sides of the containing groove; the two magnets are respectively fixed in the two fixing grooves.

5. The linear vibration motor as describe in claim 4, wherein a depth of the fixing groove is equal to a thickness of the magnet.

6. The linear vibration motor as describe in claim 1, wherein the elastic piece comprises a ring-shaped first fixing arm, a ring-shaped second fixing arm and a spring arm connecting the first fixing arm to the second fixing arm; the first fixing arm is arranged around the periphery of the accommodating groove and is fixedly connected with the weight; the second fixing arm is connected to the base for suspending the spring arm.

7. The linear vibration motor as describe in claim 6, wherein the elastic piece further comprises a reinforcing arm bent and extended from the periphery of the second fixing arm, and the reinforcing arm is fixedly connected with the base.

8. The linear vibration motor as describe in claim 6, wherein the weight protrudes from one side of the elastic piece for forming a fixing platform, the fixing platform extends along the periphery of the containing groove, and the first fixing arm is sleeved on and fixed to the fixing platform.

* * * * *